US010764724B2

(12) United States Patent
Yang

(10) Patent No.: US 10,764,724 B2
(45) Date of Patent: Sep. 1, 2020

(54) METHOD AND APPARATUS FOR IMPLEMENTING MEMBER RESOURCE PROCESSING

(71) Applicant: ZTE CORPORATION, Guangdong (CN)

(72) Inventor: Kun Yang, Guangdong (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 0 days.

(21) Appl. No.: 15/844,839

(22) PCT Filed: Apr. 22, 2016

(86) PCT No.: PCT/CN2016/080052
§ 371 (c)(1),
(2) Date: Dec. 18, 2017

(87) PCT Pub. No.: WO2017/000640
PCT Pub. Date: Jan. 5, 2017

(65) Prior Publication Data
US 2018/0124576 A1 May 3, 2018

(30) Foreign Application Priority Data
Jun. 30, 2015 (CN) .......................... 2015 1 0374703

(51) Int. Cl.
H04W 4/08 (2009.01)
H04W 4/70 (2018.01)
H04L 29/08 (2006.01)
H04L 12/24 (2006.01)

(52) U.S. Cl.
CPC ............... H04W 4/08 (2013.01); H04W 4/70 (2018.02); H04L 41/0803 (2013.01); H04L 67/16 (2013.01)

(58) Field of Classification Search
CPC .......... H04W 4/08; H04W 8/18; H04W 4/70; H04W 4/14; H04W 72/048; H04W 88/02;
(Continued)

(56) References Cited

U.S. PATENT DOCUMENTS 7,730,030 B1 * 6/2010 Xu
2013/0336222 A1 * 12/2013 Lu et al.
2014/0206408 A1 * 7/2014 Choi .................... H04W 4/70
455/519

FOREIGN PATENT DOCUMENTS

CN 104104713 A 10/2014
CN 104507054 A 4/2015
WO WO 2015/079932 A1 6/2015

OTHER PUBLICATIONS

"ETSI Technical Specification on Machine-to-Machine communications: Functional Architecture", ETSI TS 102 690, V2.1.1 (Oct. 2013), Oct. 2013. (Year: 2013).*
(Continued)

Primary Examiner — Marsha D Banks Harold
Assistant Examiner — Dharmesh J Patel
(74) Attorney, Agent, or Firm — Li & Cai Intellectual Property (USA) Office

(57) ABSTRACT

Disclosed are a method and apparatus for implementing member resource processing, the method comprising: a virtual sub-resource of a pre-created group resource triggers, according to a forwarding request of an initiator, a local common services entity (CSE) to send an acquisition request for acquiring member resource attribute information to one or more member resources, the initiator being a remote CSE or an application entity (AE); and the local CSE sends an update request for forwarding the acquired member resource attribute information to one or more target member resources, so as to update the one or more target member resources. The present disclosure, simplifies a process of
(Continued)

forwarding information between member resources, saves signaling overhead, avoids the problem of possible network congestion caused by occupation of network resources, and improves real time performance of the forwarding of the information between the member resources.

10 Claims, 2 Drawing Sheets

(58) Field of Classification Search
CPC . H04L 61/103; H04L 61/2514; H04L 61/256; H04L 65/102; H04L 61/1511; H04L 61/2015; H04L 61/2517
See application file for complete search history.

(56) References Cited

OTHER PUBLICATIONS

Hong Y. et al., "TS-0001 Functional Architecture-V2.2.0", ARC-2015-1926R01-TS-0001_Functional_Architecture-V2_2_0.ZIP, vol. WG2, pp. 1-336 (Jun. 4, 2015).
European Extended Supplementary Search Report dated Apr. 23, 2018 received in European Patent Application No. 16 81 7004.1.
International Search Report dated Jul. 7, 2016 issued in PCT/CN2016/080052.

\* cited by examiner

METHOD AND APPARATUS FOR IMPLEMENTING MEMBER RESOURCE PROCESSING

CROSS REFERENCE TO RELATED APPLICATION

The present application is the national phase of International Application No. PCT/CN2016/080052, filed on Apr. 22, 2016, and the entire contents thereof are incorporated herein by reference.

TECHNICAL FIELD

The present application relates to, but not limited to, Internet of Things technology, and more particularly, to a method and apparatus for implementing member resource processing.

BACKGROUND

The Machine to Machine (M2M) communication system consists of individual M2M nodes and an underlying network. The M2M nodes communicate with each other through the underlying network. An M2M node comprises at least one Application Entity (AE) or one Common Services Entity (CSE). AE is the logical unit that executes the M2M application and the CSE is the logical unit that manages and serves the application. An underlying Network Services Entity (NSE) provides the CSE with device management, location service, equipment trigger and other services, such as home subscriber server (HSS), MTC-InterWorking Function (MTC-IWF) entity, etc.

The communication between M2M applications is implemented through the interworking between CSEs. The M2M applications need to register with the CSEs, and the CSEs also need to register with each other, so that the interworking between the M2M applications can be implemented through the communication between the CSEs. FIG. 1 is a schematic diagram of the architecture of an M2M system. As shown in FIG. 1, in M2M system architecture, the application node is an end execution node 1, such as a smart meter, a temperature measurement and control sensor, fire alarm, a smart home appliance, etc.; a middle node (MN) is a middleware (for example, a gateway) connecting an end execution node to a network side server; an infrastructure node (IN) is a network side server, and an application registered with an infrastructure node, that is, an IN-AE, may be a management platform of an M2M service provider (M2M SP). Application nodes can be classified into two categories according to their functions: nodes that comprise CSE and nodes that do not comprise CSE. An Application Dedicated Node (ADN) comprises at least one AE and does not comprise a CSE; an application service node (ASN) comprises at least one AE and one CSE.

The "group management" common services function in the CSE enables the M2M system to perform batch operations on multiple devices, applications, or resources in a group. A group (<group>) resource represents a group of the same or multiple types of resources, and it is configured that batch operations are performed on resources represented by an attribute of the member identifications (memberIDs, the attribute representing the members of the group). The resource represented by the attribute of the member identifications is abbreviated as member resource herein. The group resource further comprises directly forwarding point (<fanOutPoint>) that allows operations to be performed onto the virtual resources of the resources represented by the members. When an operation request is sent to the resources of <fanOutPoint>, a operation request for triggering is distributed to the members of respective group resources represented by the attribute memberIDs, while the response to the operation request from each member is collected and fed back to the initiator of the operation request. That is, when a remote CSE sends a forward request to a local CSE, the local CSE acquires to-be-forwarded member resources from the group resources and feeds same back to the initiator, the initiator transmits the to-be-forwarded member resources to the local CSE again, which will add the to-be-forwarded member resources into target member resources for update. The steps of forwarding the member resources are cumbersome and difficult to meet real-time requirements, and larger signaling overhead may occupy more network resources and may cause network congestion. These problems are more obvious for M2M applications that have a large number of member resources, a large amount of information transfer between member resources and high real-time requirements.

In summary, the existing process of forwarding the attribute information of member resources is cumbersome, has low real-time efficiency and large signaling overhead, and may cause network congestion due to the occupancy of network resources.

SUMMARY

The following is an overview of the subject matter described in detail herein, which is not intended to limit the scope of the claims.

Provided in the embodiments of the present disclosure are a method and apparatus for implementing member resource processing.

Provided in the embodiments of the present disclosure is a method for implementing member resource processing, comprising:

According to a forward request of an initiator, a pre-created virtual sub-resource of a group resource triggering a local CSE to send to one or more member resources, an acquisition request for acquiring the attribute information of member resources;

The local CSE sending an update request for forwarding the acquired attribute information of member resources to one or more target member resources so as to update the attribute information of the target member resources;

The initiator being a remote CSE or AE.

The method may previously further comprise: the local CSE receiving a create request sent from an initiator; according to the create request sent by the initiator, creating the virtual sub-resource in the group resource, and upon completing the creation of the virtual sub-resource, feeding the address of the virtual sub-resource back to the initiator.

Upon completing the forwarding of the acquired attribute information of member resources, the method may further comprise:

The local CSE sending a forward response to the initiator, to feed back the completion of the forwarding of the attribute information of member resources.

Wherein, the forward request comprises:

The identity information of the initiator, the address of the pre-created virtual sub-resource, and instruction information for forwarding the attribute information of member resources to the target member resources.

Wherein, the acquisition request at least comprises:

The identity information of the initiator, the address of the member resources, and instruction information for acquiring the attribute information of the member resources.

Wherein, the sending an update request for forwarding the acquired attribute information of member resources to the target member resources comprises:

According to the content of the instruction information for forwarding the attribute information of member resources to the target member resources in the forward request, the local CSE generating and sending an update request which at least comprises the address of the target member resources and instructs to update the attribute information of the target member resources according to the attribute information of the member resources, so as to update the attribute information of the target member resources according to the update request.

In another aspect, further provided in the embodiments of the present disclosure is an apparatus for implementing member resource processing, comprising a trigger acquiring unit and a forwarding updating unit, wherein, The trigger acquiring unit is configured to trigger a local CSE, according to a forward request of an initiator, by means of a pre-created virtual sub-resource of a group resource, to send to one or more member resources, an acquisition request for acquiring the attribute information of member resources;

The forwarding updating unit is configured to send an update request for forwarding the acquired attribute information of member resources to one or more target member resources so as to update the attribute information of the target member resources;

The initiator is a remote CSE or AE.

The apparatus may further comprise a reception and creation unit configured to receive a create request sent from the initiator, create the virtual sub-resource of the group resource according to the create request, and upon completing the creation of the virtual sub-resource, feed the address of the virtual sub-resource back to the initiator.

The apparatus may further comprise a forwarding responding unit configured to, upon completing the forwarding of the acquired attribute information of member resources, send a forward response to the initiator, to feed back the completion of the forwarding of the attribute information of member resources.

Wherein, the forwarding updating unit is configured to generate and send, according to the forward request, an update request which at least comprises the address of the target member resources and instructs to update the attribute information of the target member resources according to the acquired attribute information of the member resources, so as to update the attribute information of the target member resources according to the update request.

In the embodiments of the present disclosure, a pre-created virtual sub-resource of a group resource triggers a local CSE according to a forward request of an initiator, to send to one or more member resources, an acquisition request for acquiring the attribute information of member resources; the local CSE sends an update request for forwarding the acquired attribute information of member resources to one or more target member resources so as to update the attribute information of the target member resources; the initiator is a remote CSE or AE. In the embodiments of the present disclosure, as the local CSE is triggered by the pre-created virtual sub-resource of the group resource to acquire the attribute information of member resources and directly forward same to the target member resources, the process of forwarding information between member resources is simplified, signaling overhead is saved, the network congestion problem that may occur due to the occupancy of network resources is avoided, and in the meantime, real-time information transfer between member resources is also improved.

Other aspects will become apparent upon reading and understanding the drawings and detailed description.

DETAILED DESCRIPTION

Hereinafter, the embodiments of the present disclosure will be described in detail in conjunction with the accompanying drawings. It should be noted that, in the case of no conflict, the embodiments in the present application and the features in the embodiments may be arbitrarily combined with each other.

Figure 1:
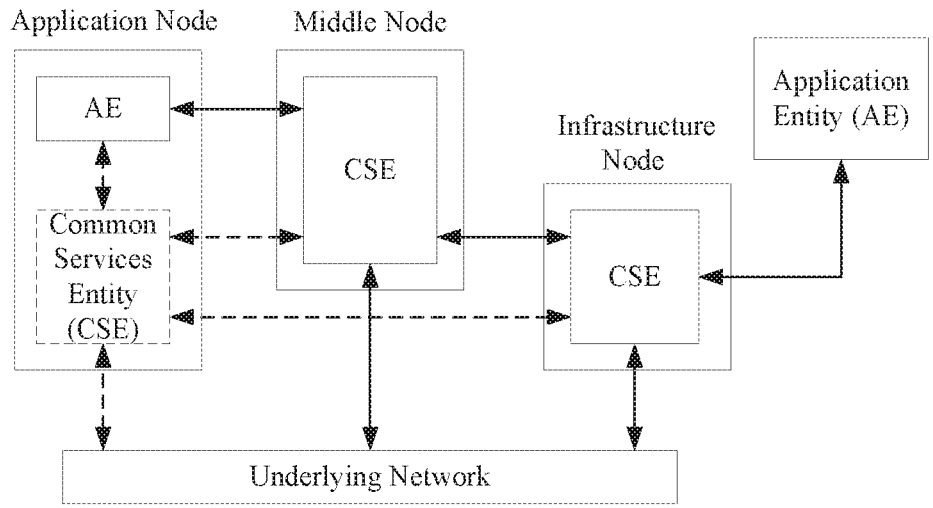
FIG. 1 is a schematic diagram of architecture of an M2M system.
Figure 2:
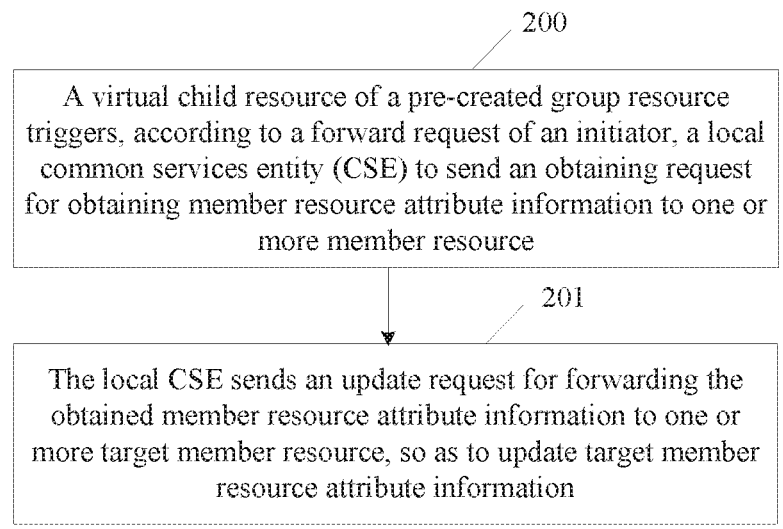
FIG. 2 is a flowchart of a method for implementing member resource processing according to an embodiment of the present disclosure.

FIG. 2 is a flowchart of a method for implementing member resource processing according to an embodiment of the present disclosure. As shown in FIG. 2, the method comprises:

Step 200: According to a forward request of an initiator, a pre-created virtual sub-resource of a group resource triggering a local CSE to send to one or more member resources, an acquisition request for acquiring the attribute information of member resources.

In this step, the forward request may comprise:

The identity information of the initiator, the address of the pre-created virtual sub-resource, and information for instructing to forward the attribute information of member resources to the target member resources.

The acquisition request at least may comprise:

The identity information of the initiator, the address of the member resources, and information for instructing to acquire the attribute information of member resources.

It should be noted that the virtual sub-resource is generally created according to service requirements. For example, when a group resource is advertised to a remote CSE, the remote CSE sends a create request, according to the attribute information of the group resource, to the group resource to create a virtual sub-resource.

Before this step, the method may further comprise:

The local CSE receiving a create request sent from an initiator;

According to the create request sent by the initiator, creating the virtual sub-resource in the group resource, and upon completing the creation of the virtual sub-resource, feeding the address of the virtual sub-resource back to the initiator.

It should be noted that, a method for creating a virtual sub-resource is the same as a method for creating a directly forwarding point in the background art, and details thereof will not be repeated herein again.

Step 201: The local CSE sending an update request for forwarding the acquired attribute information of member resources to one or more target member resources so as to update the attribute information of the target member resources;

Wherein, the initiator is a remote CSE or AE.

In this step, the sending an update request for forwarding the acquired attribute information of member resources to the target member resource may comprise:

According to the content of the instruction information for forwarding the attribute information of member resources to the target member resources in the forward request, the local CSE generating and sending an update request which at least comprises the address of the target member resources and instructs to update the attribute information of the target member resources according to the acquired attribute information of member resources, so as to update the attribute information of the target member resources according to the update request.

Upon completing the forwarding of the acquired attribute information of member resources, the method in the embodiments of the present disclosure may further comprise:

The local CSE sending a forward response to the initiator, to feed back the completion of the forwarding of the attribute information of member resources.

With the method in the embodiments of the present disclosure, as a pre-created virtual sub-resource of a group resource triggers a local CSE to acquire the attribute information of member resources and directly forward same to the target member resources, the process of forwarding information between member resources is simplified, signaling overhead is saved, the network congestion problem that may occur due to the occupancy of network resources is avoided, and in the meantime, real-time information transfer between member resources is also improved.

Figure 3:
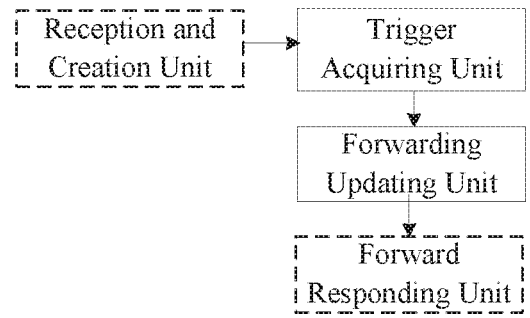
FIG. 3 is a structural diagram of an apparatus for implementing member resource processing according to an embodiment of the present disclosure.

FIG. 3 is a structural diagram of an apparatus for implementing member resource processing according to an embodiment of the present disclosure. As shown in FIG. 3, the apparatus comprises: a trigger acquiring unit and a forwarding updating unit:

The trigger acquiring unit is configured to trigger a local CSE, according to a forward request of an initiator, by means of a pre-created virtual sub-resource of a group resource, to send to one or more member resources, an acquisition request for acquiring the attribute information of member resources;

The forwarding updating unit is configured to send an update request for forwarding the acquired attribute information of member resources to one or more target member resources so as to update the attribute information of the target member resources; and Wherein, the forwarding updating unit is configured to generate and send, according to the forward request, an update request which at least comprises the address of the target member resources and instructs to update the attribute information of the target member resources according to the acquired attribute information of the member resources, so as to update the attribute information of the target member resources according to the update request.

Wherein, the initiator is a remote CSE or AE.

The apparatus in the embodiments of the present disclosure may further comprise a reception and creation unit configured to receive a create request sent from the initiator, create the virtual sub-resource of the group resource according to the create request, and upon completing the creation of the virtual sub-resource, feed the address of the virtual sub-resource back to the initiator.

The apparatus in the embodiments of the present disclosure may further comprise a forwarding responding unit configured to, upon completing the forwarding of the acquired attribute information of member resources, send a forward response to the initiator, to feed back the completion of the forwarding of the attribute information of member resources.

The embodiments of the present disclosure are clearly described in detail below through specific embodiments. The embodiments are merely used to describe the present disclosure, and are not intended to limit the protection scope of the above methods in the embodiments of the present disclosure.

Embodiment 1

Figure 4:
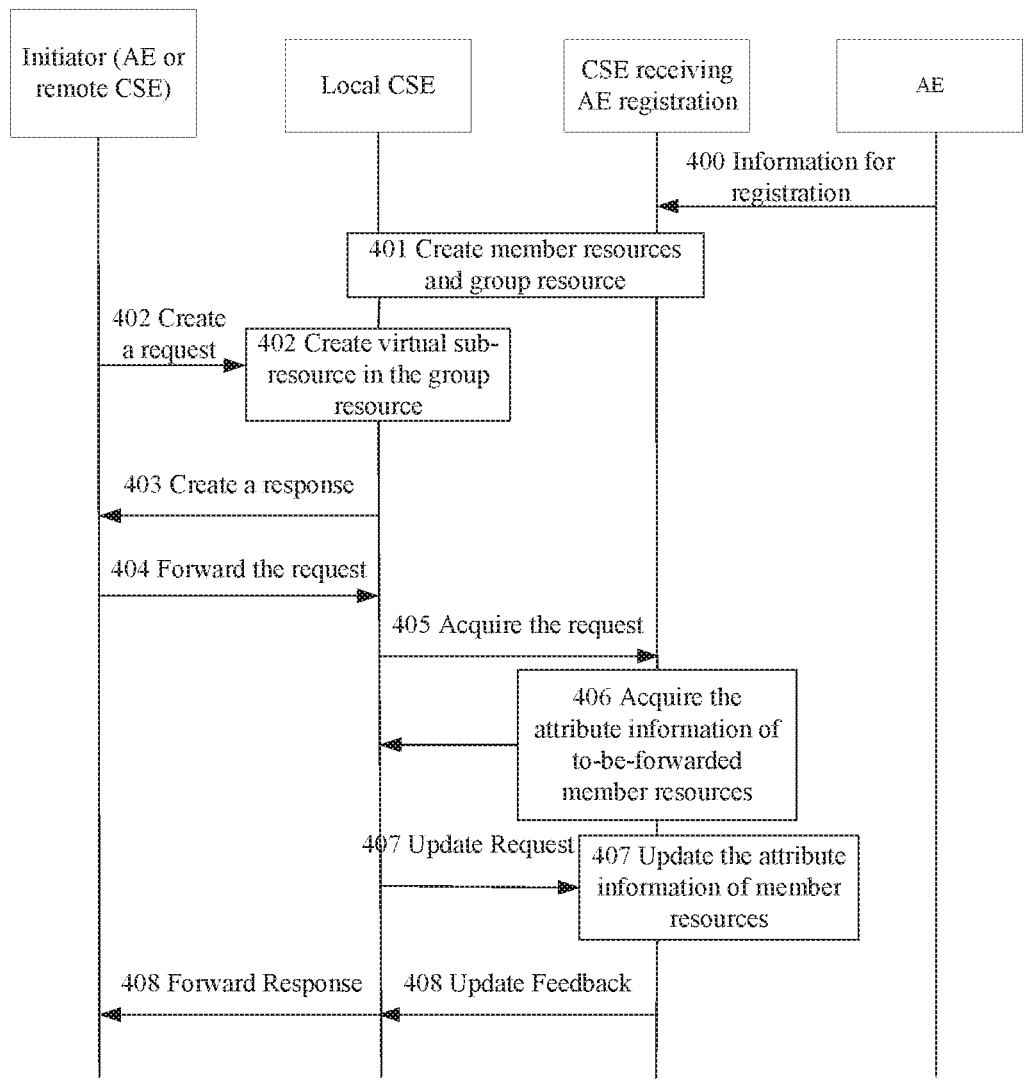
FIG. 4 is a flowchart of a method according to a first embodiment of the present disclosure.

FIG. 4 is a flowchart of a method according to a first embodiment of the present disclosure. As shown in FIG. 4, the method comprises:

Step 400: Application entities respectively register with the corresponding CSEs. The CSEs create corresponding resources for the respective application entities. Specifically, a first application entity (AE1) is registered with a first public service entity (CSE1), and the CSE1 creates a resource <ae1> for the AE1; AE2 is registered with CSE2, and the CSE2 creates a resource <ae2> for AE2;

Step 401: A local CSE creates a group resource <group> for the resource <ae1> and the resource <ae2>; that is, the resource <ae1> and the resource <ae2> are the member resources in the group resource.

Step 402: The remote CSE sends a create request to the local CSE to create a virtual sub-resource in the group resource. Here, the virtual sub-resource may be <ForwardDirectPoint>;

Step 403: upon completing the creation of the virtual sub-resource, the local CSE sends a create response to the remote CSE, where the create response comprises the created address of the virtual sub-resource.

Step 404: The remote CSE sends a forward request to the virtual sub-resource according to the created address. Here, the forward request comprises the identity information (which may be an identity identifier) of the remote CSE, the created address of the virtual sub-resource and information for instructing to forward the attribute information of to-be-forwarded member resources to the target member resources. The information for instructing to forward the attribute information of to-be-forwarded member resources to the target member resources in the embodiment may instruct to forward the first attribute (Attribute1) of the resource <ae1> in the member resources to the second attribute (Attribute2) to the resource <ae2> in the member resources.

Step 405: After receiving the forward request, the virtual sub-resource triggers the local CSE to send an acquisition request to acquire the attribute information of the to-be-forwarded member resources; the acquisition request at least comprises: the identity information of the initiator, the address of the member resources, and information for instructing to acquire the attribute information of the member resources.

Step 406: Acquire the attribute information of to-be-forwarded member resources, that is, by means of the acquisition request comprising the address of the member resources and information for instructing to acquire the attribute information of the member resources, namely, the CSE1 for creating the member resources may be determined according to the address of the member resources, and the CSE1 feeds the attribute Attribute1 of the created resource <ae1> back to the local CSE;

Step 407: Forward the acquired attribute information of the member resources to the target member resources and update the attribute information of the target member resources. According to the content of the information for instructing to forward the attribute information of member resources to the target member resources in the forward request, the local CSE generates and sends an update request which at least comprises the identity identifier of the local CSE and the address of the target member resources and instructs to update the attribute of the target member resources according to the attribute information of member resources, so as to update the attribute information of the target member resources according to the update request. That is, after receiving the update request, the CSE 2 updates the content of the attribute of the target member resources according to the attribute information of the member resources, and updates the attribute Attribute2 of the update resource <ae2>.

Step 408: After the target member resources are updated, they are fed back to the local CSE. The local CSE sends a forward response to the remote CSE to feed back the completion of the forwarding of the attribute information of the member resources.

Embodiment 2

The attribute information of one member resource in this embodiment is forwarded to two target member resources, and the target member resources are updated.

AE3 is registered with CSE3, and CSE3 creates a resource <ae3> for AE3; AE4 is registered with CSE4, and CSE4 creates a resource <ae4> for AE4; AE5 is registered with CSE5, CSE5 creates a resource <ae5> for AE5, and the local CSE constructs group resource <group2> with resource <ae3>, resource <ae4> and resource <ae4>.

After the remote CSE creates the virtual sub-resource in the group resource <group2> (the virtual sub-resource here may be <ForwardDirectPoint>), the remote CSE creates the virtual sub-resource in the resource <group> and instructs to forward the attribute information of the resource <ae3> to the resource <ae4> and to the resource <ae5>. Here, the attribute information of the resource <ae3> is the attribute information of the to-be-forwarded member resources, and the resource <ae4> and the resource <ae5> are the target member resources.

The pre-created virtual sub-resource triggers the local CSE to send an acquisition request for acquiring the attribute Attribute3 of the to-be-forwarded resource <ae3>.

The local CSE forwards the acquired attribute Attribute3 of the resource <ae3> directly to the resource <ae4> and the resource <ae5>.

The local CSE sends a forward response to the remote CSE to feed back the completion of the forwarding of the attribute information of the resource <ae3>.

Embodiment 3

The attribute information of two member resources in this embodiment is forwarded to one target member resource to update the target member resource.

AE6 is registered with CSE6, CSE6 creates a resource <ae6> for AE6; AE7 is registered with CSE7, CSE7 creates a resource <ae7> for AE7; AE8 is registered with CSE8, CSE8 creates a resource <ae8> for AE8; and a local CSE constructs a group resource <group3> with the resource <ae6>, the resource <ae7>, and the resource <ae8>.

After the remote CSE creates a virtual sub-resource in the group resource <group3> (here the virtual sub-resource may be <ForwardDirectPoint>), the remote CSE creates a virtual sub-resource in the resource <group> and then instructs to forward the attribute information of the resource <ae6> and the resource <ae7> to the resource <ae8>; here, the attribute information of the resource <ae6> and the resource <ae7> is the attribute information of the to-be-forwarded member resources, and the resource <ae8> is the target member resource.

The pre-created virtual sub-resource triggers the local CSE to send an acquisition request to acquire the attribute Attribute6 of the resource <ae6> and the attribute Attribute7 of the resource <ae7> that are to be forwarded.

The local CSE forwards the acquired attribute Attribute6 of the resource <ae6> and the attribute Attribute7 of the resource <ae7> directly to the resource <ae8>.

The local CSE sends a forward response to the remote CSE to feed back the completion of the forwarding of the attribute Attribute6 of the resource <ae6> and the attribute Attribute7 of the resource <ae7>.

Further provided in the embodiments of the present disclosure is a computer readable storage medium storing computer executable instructions, which when executed by a processor implement the abovementioned method. The storage medium may comprise any one or several of an optical disk, a floppy disk, a hard disk, a rewritable memory, etc.

A person of ordinary skill in the art may understand that all or part of the steps in the foregoing methods may be completed by relevant hardware (for example, a processor) instructed by a program, and the program may be stored in a computer-readable storage medium, such as a read-only memory, a magnetic disk, an optic disk, etc. Alternatively, all or part of the steps of the abovementioned embodiments may also be implemented by using one or more integrated circuits. Correspondingly, each module/unit in the abovementioned embodiments can be implemented in the form of hardware, for example, its corresponding function can be implemented by means of an integrated circuit, and can also be implemented in the form of a software function module, for example, a processor executes a program/instruction stored in a memory to implement the corresponding function thereof. The embodiments of the present disclosure are not limited to any particular combination of hardware and software.

Although the embodiments of the present disclosure are described above, the content described above is only used to facilitate understanding of the present disclosure, and is not intended to limit the present disclosure. Any modification and variation may be made by those skilled in the art without departing from the spirit and scope of the present disclosure, but the scope of protection of the present disclosure shall be based on the scope of the appended claims.

INDUSTRIAL APPLICABILITY

According to the method and the apparatus for implementing member resource processing provided in the embodiments of the present disclosure, a pre-created virtual sub-resource of a group resource triggers a local CSE according to a forward request of an initiator, to send to one or more member resources, an acquisition request for acquiring the attribute information of member resources; the local CSE sends an update request for forwarding the acquired attribute information of member resources to one or more target member resources so as to update the attribute information of the target member resources; wherein, the initiator is a remote CSE or AE. In the embodiments of the present disclosure, as the local CSE is triggered by the pre-created virtual sub-resource of the group resource to acquire the attribute information of member resources and directly forward same to the target member resources, the process of forwarding information between member resources is simplified, signaling overhead is saved, the network congestion problem that may occur due to the occupancy of network resources is avoided, and in the meantime, real-time information transfer between member resources is also improved.

The invention claimed is:

1. A method for implementing member resource processing, comprising:
  sending a forward request to a pre-created virtual sub-resource of a group resource according to a created address, according to the forward request of an initiator, the virtual sub-resource triggering a local common services entity (CSE) to send to one or more member resources, an acquisition request for acquiring the attribute information of member resources, wherein the forward request comprises: the identity information of the initiator, the address of the pre-created virtual sub-resource, and instruction information for forwarding the attribute information of member resources to the target member resources;
  according to the created address of the virtual sub-resource and the instruction information, forwarding the attribute information of member resources to the target member resources; and
  the local CSE sending an update request for forwarding the acquired attribute information of member resources to one or more target member resources so as to update the attribute information of the target member resources, wherein,
  the initiator is a remote CSE or application entity (AE).

2. The method according to claim 1, wherein, the method previously further comprises:
  the local CSE receiving a create request sent from an initiator;
  according to the create request sent by the initiator, creating the virtual sub-resource in the group resource, and upon completing the creation of the virtual sub-resource, feeding the address of the virtual sub-resource back to the initiator.

3. The method according to claim 1, wherein, upon completing the forwarding of the acquired attribute information of member resources, the method further comprises:
  the local CSE sending a forward response to the initiator, to feed back the completion of the forwarding of the attribute information of member resources.

4. The method according to claim 1, wherein, the acquisition request at least comprises:
  the identity information of the initiator, the address of the member resources, and instruction information for acquiring the attribute information of the member resources.

5. The method according to claim 1, wherein, the sending an update request for forwarding the acquired attribute information of member resources to the target member resources comprises:
  according to the content of the instruction information for forwarding the attribute information of member resources to the target member resources in the forward request, the local CSE generating and sending an update request which at least comprises the address of the target member resources and instructs to update the attribute information of the target member resources according to the acquired attribute information of the member resources, so as to update the attribute information of the target member resources according to the update request.

6. An apparatus for implementing member resource processing, comprising:
  a processor; and
  a memory for storing instructions executable by the processor;
  wherein the processor is configured to:
  send a forward request to a pre-created virtual sub-resource of a group resource according to a created address;
  trigger a local common services entity (CSE), according to the forward request of an initiator, by means of the virtual sub-resource, to send to one or more member resources, an acquisition request for acquiring the attribute information of member resources, wherein the forward request comprises: the identity information of the initiator, the address of the pre-created virtual sub-resource, and instruction information for forwarding the attribute information of member resources to the target member resources;
  forward the attribute information of member resources to the target member resources according to the created address of the virtual sub-resource and the instruction information; and
  send an update request for forwarding the acquired attribute information of member resources to one or more target member resources so as to update the attribute information of the target member resources;
  wherein the initiator is a remote CSE or application entity (AE).

7. The apparatus according to claim 6, wherein, the processor is further configured to receive a create request sent from the initiator, to create the virtual sub-resource of the group resource according to the create request, and upon completing the creation of the virtual sub-resource, to feed the address of the virtual sub-resource back to the initiator.

8. The apparatus according to claim 6, wherein, the processor is further configured to, upon completing the forwarding of the acquired attribute information of member resources, send a forward response to the initiator, to feed back the completion of the forwarding of the attribute information of member resources.

9. The apparatus according to claim 6, wherein, the processor is further configured to generate and send, according to the forward request, an update request which at least comprises the address of the target member resources and instructs to update the attribute information of the target member resources according to the acquired attribute information of the member resources, so as to update the attribute information of the target member resources according to the update request.

10. A non-transitory computer readable storage medium, with computer executable instructions stored thereon, which are executed by a processor to:
  send a forward request to a pre-created virtual sub-resource of a group resource according to a created address;
  trigger a local common services entity (CSE), according to the forward request of an initiator, by means of the virtual sub-resource, to send to one or more member resources, an acquisition request for acquiring the attribute information of member resources;

forward the attribute information of member resources to the target member resources according to the created address of the virtual sub-resource and the instruction information; and send an update request for forwarding the acquired attribute information of member resources to one or more target member resources so as to update the attribute information of the target member resources, wherein the initiator is a remote CSE or application entity (AE).

\* \* \* \* \*